United States Patent
Cobb

(10) Patent No.: US 11,286,395 B2
(45) Date of Patent: Mar. 29, 2022

(54) WASHABLE PAINT COMPOSITION

(71) Applicant: Chroma Australia Pty Limited, New South Wales (AU)

(72) Inventor: James Campbell Cobb, New South Wales (AU)

(73) Assignee: Chroma Australia Pty Limited, New South Wales (AU)

( * ) Notice: Subject to any disclaimer, the term of this patent is extended or adjusted under 35 U.S.C. 154(b) by 268 days.

(21) Appl. No.: 16/082,897

(22) PCT Filed: Mar. 8, 2017

(86) PCT No.: PCT/AU2017/050209
§ 371 (c)(1),
(2) Date: Sep. 6, 2018

(87) PCT Pub. No.: WO2017/152233
PCT Pub. Date: Sep. 14, 2017

(65) Prior Publication Data
US 2019/0085184 A1    Mar. 21, 2019

(30) Foreign Application Priority Data
Mar. 8, 2016  (AU) .................................. 2016900871

(51) Int. Cl.
| | | |
|---|---|---|
| *C09D 7/44* | (2018.01) | |
| *C09D 5/06* | (2006.01) | |
| *C09D 5/02* | (2006.01) | |
| *C09D 133/08* | (2006.01) | |
| *C09D 7/40* | (2018.01) | |
| *C09D 7/61* | (2018.01) | |
| *C09D 7/41* | (2018.01) | |
| *C08L 33/08* | (2006.01) | |

(52) U.S. Cl.
CPC ................. *C09D 7/44* (2018.01); *C09D 5/02* (2013.01); *C09D 5/06* (2013.01); *C09D 7/40* (2018.01); *C09D 7/61* (2018.01); *C09D 133/08* (2013.01); *C08L 33/08* (2013.01); *C09D 7/41* (2018.01)

(58) Field of Classification Search
None
See application file for complete search history.

(56) References Cited

U.S. PATENT DOCUMENTS

| | | | | |
|---|---|---|---|---|
| 1,552,024 | A * | 9/1925 | Alton | C01F 11/181 |
| | | | | 423/432 |
| 4,826,535 | A | 5/1989 | Godly | |
| 6,124,377 | A | 9/2000 | Kaiser et al. | |
| 6,129,989 | A * | 10/2000 | Sapper | B05D 7/532 |
| | | | | 428/500 |
| 7,851,545 | B2 | 12/2010 | Cobb | |
| 2005/0143505 | A1 * | 6/2005 | Rosekelly | C09D 7/41 |
| | | | | 524/236 |

FOREIGN PATENT DOCUMENTS

| | | | | | |
|---|---|---|---|---|---|
| CN | | 103649249 A | * | 3/2014 | ........... C09J 105/04 |
| CN | | 104987783 A | * | 10/2015 | ........... C09D 183/04 |
| WO | WO-0036029 A1 | * | 6/2000 | ........... C09D 5/29 |
| WO | WO-2013002121 A1 | * | 1/2013 | ........... C09D 175/06 |

OTHER PUBLICATIONS

WO-2013002121-A1—English translation (Year: 2013).*
CN-103649249-A—English translation (Year: 2014).*
CN-104987783-A—English translation (Year: 2015).*
International Search Report and Written Opinion for International Application No. PCT/AU2017/050209 dated Apr. 21, 2017. (9 pages).

* cited by examiner

*Primary Examiner* — Stefanie J Cohen
(74) *Attorney, Agent, or Firm* — Haynes and Boone, LLP

(57) ABSTRACT

There is disclosed a washable paint composition suitable for use by children. The composition includes one or more pigments, specific extender pigments, alkali soluble thickeners and non-volatile neutralisers in an amount that allows the paint composition, should it come in contact with a cotton based textile, to be solubilised in a water solution and washed from the textile without leaving a stain.

14 Claims, No Drawings

WASHABLE PAINT COMPOSITION

CROSS-REFERENCE TO RELATED APPLICATIONS

The present application claims priority from Australian Provisional Patent Application No 2016900871 filed on 8 Mar. 2016, the content of which is incorporated herein by reference.

TECHNICAL FIELD

The present disclosure relates to paint compositions that are washable from textiles.

BACKGROUND

The activity of painting is used as an important tool in a child's creative and educational development. Tempera or poster paint compositions are a popular form of children's paint. The majority of paints use pigments or acid dyes as the colour source. A major drawback of most paints, and in particular most conventional children's paints, is that the pigment or dye leaves stains on clothing that is difficult to remove. Staining tends to be worse once the conventional paint composition has dried on the textile. Although wet paint may be washed out relatively easily from a textile, washing in a classroom environment may not be carried out immediately and when the pigment dries it is difficult to remove and tends to permanently stain the textile.

There are few washable paints that are commercially available that leave garments free of stains. Some commercially available children's paints claim to be re-soluble and "washable" in water but actually leave a stain in most of the textiles worn by children. This is unsatisfactory as in most cases the clothing needs to be replaced because of accidental spillage of paint. Most brands achieve their degree of washability by drastically reducing the pigment content of their paint. This results in the paints having significantly reduced chromatic intensity. Such paints are educationally unsatisfactory because children using them are deprived of creative and exciting art lessons which are an important part of education during their formative years.

Textiles, such as cotton, are formed from intertwined or woven strands of material, threads, and microscopic pigment particles of a paint become entrapped within these strands leaving a stain. When the paint is soluble enough to allow the body of the paint itself to be removed with soap and water it commonly leaves a halo like residual stain on the textile. In art education for young children the challenge is that conventional pigments become snagged in the clothing that children wear, in particular, fibrous textiles such as cotton, leaving stains which cannot be removed.

There is a need for a paint composition containing colour that does not permanently stain textiles. In particular, there is a need for a paint composition containing pigment in an amount that provides a satisfactory chromatic effect and is easily removed from textiles such as clothing.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

The present disclosure uses conventional pigments in the quantities needed to make vivid and exciting paint compositions which are fully washable from cotton based textiles. This has been achieved by formulating a paint composition that includes pigments, specific extender pigments, alkali soluble thickeners and non-volatile neutralisers in an amount that allows the paint composition, should it come in contact with a cotton based textile, to be solubilised in a water solution and washed from the textile without leaving a stain.

The resulting washable paint compositions disclosed herein is a new form of a thick, heavy bodied, tempera paint composition which when applied to a substrate (such as paper) and allowed to dry, produces a colour painting with the expected chromatic effect for the pigment used. The vibrant colour of the paint composition and its washability from cotton based textiles make it suitable for use by children who tend to wear cotton based clothes.

It will be understood that the "washable paint composition" described herein is a new form of tempera paint composition and accordingly may be referred to hereinafter as a "washable tempera paint composition", Disclosed herein is a washable paint composition comprising:
a) one or more pigments;
b) one or more thickeners in an amount that has both a thickening and binding effect;
c) one or more surfactants;
d) one or more extender pigments;
e) one or more non-volatile neutralisers.

Also disclosed herein is a paint composition comprising:
a) one or more pigments;
b) one or more acrylic thickeners in an amount that has both a thickening and binding effect;
c) one or more surfactants;
d) one or more extender pigments;
e) one or more non-volatile neutralisers,
in an amount that allows the composition to remain in a re-wettable and hygroscopic state;
and wherein the paint composition is washable from a textile.

Also disclosed herein is use of diatomite as a sole extender pigment in the preparation of a washable paint composition wherein the diatomite is combined with:
a) one or more pigments;
b) one or more acrylic thickeners in an amount that has both a thickening and binding effect;
c) one or more surfactants;
e) one or more non-volatile neutralisers.

Also disclosed herein is use of a mixture of diatomite and calcium carbonate as sole extender pigments in the preparation of a washable paint composition wherein the diatomite and amorphous calcium carbonate is combined with:
a) one or more pigments;
b) one or more acrylic thickeners in an amount that has both a thickening and binding effect;
c) one or more surfactants;
e) one or more non-volatile neutralisers.

In some embodiments of the above disclosures, the one or more pigments, acrylic thickeners, surfactants and non-volatile neutralisers are present in an amount that allows the paint composition to remain in a re-wettable and hygroscopic state; such that the paint composition is washable from a textile.

Also disclosed is a method of solubilising the washable paint composition disclosed herein from a cotton based textile stained with the washable paint composition comprising the step of contacting the cotton based textile stained with the washable paint composition with a water solution for a period of time sufficient to solubilise the washable paint composition. In one embodiment the paint composition is washed from the cotton based textile without leaving a stain.

To be truly washable a good children's tempera paint needs to be well pigmented in the first place so that it is satisfying to use, but the dry paint needs to dissolve easily, and any remaining stains if visible also need to be easily removable.

The inventors have surprisingly found that the unique combination of the above disclosed components is able to produce a tempera paint composition that presents with good colour saturation and dries to a state that is resoluble in a water solution. This unconventional approach yields a non-toxic paint that is easily washed from cotton or cotton/synthetic textiles usually worn by children.

In one embodiment, use of acrylic alkali soluble thickeners as both thickener and binder for the paint composition provides a very stable mixture with extremely good colour development. In such an embodiment, generous amounts of pigments can be used to provide a desirable paint with strong colour which can be removed easily from clothing by washing the affected area with water and a detergent, such as washing powder or liquid. Stains that may result from some pigments may require the clothing to be soaked in water and detergent for a period of time, for example, two hours or more, such as overnight, before rinsing with water.

The inventor has surprisingly found that the use of diatomite (e.g. Celatom®) as an extender pigment has a beneficial effect on the paint composition over conventional extender pigments, in that significantly less extender pigment (diatomite) is required in the composition when diatomite (e.g. Celatom) is used compared to other more conventional extender pigments such as crystalline calcium carbonate. Without being bound by theory, the inventor believes that because less diatomite (Celatom) is needed in the paint composition to absorb the pigment load, the binder/thickener (specifically, the acrylic alkali soluble thickener) is able to maintain the pigment in a wetted out high chromatic state. In contrast, the inventors have observed that when crystalline calcite (crystalline calcium carbonate) is used as the sole pigment extender, a greater quantity is required to absorb the pigment load, such that when the paint dries the colour becomes pale and washed out looking even though it may have appeared vibrant and fresh whilst the paint was wet.

Pigment

One or more pigments are included in the paint compositions disclosed herein. The pigment is present in an amount that provides the desired chromatic intensity.

According to one embodiment, the paint composition of the present disclosure provides the same chromatic intensity in both the wet and dry state. An advantageous property of the present invention is that the paint composition possesses the desired colour vibrancy in both the wet and dry state. This is achieved by the unique combination of pigment, pigment extender and acrylic thickener to provide a paint which has the expected chromatic intensity of the pigment chosen when wet and dry.

Pigmentation provides colour and opacity and may contribute to other properties of the tempera paint composition disclosed herein. A person skilled in the art will be aware that pigment particle size and shape, ease of wettability or properties relating to specific density contribute to the viscosity and application characteristics of the wet paint composition and ultimately properties of the dried paint coatings. A person skilled in the art will therefore appreciate that the choice of pigment will have an effect on the choice of other ingredients such as thickeners.

It is well within the skill of the addressee to determine the appropriate selection of pigment and the quantity required to produce the desired chromatic intensity using routine trial and experimentation.

The pigment used in the paint composition disclosed herein may be any conventional pigment including organic or inorganic compounds, natural or synthetic which may be used separately or in combination. Titanium dioxide is a common white pigment with a high refractive index and excellent hiding power (the ability to render a paint opaque). It is frequently used with both coloured organic and inorganic pigments. Iron oxides range in colour from yellow and red to brown and black. Azo pigments are a common class of organic colour pigments.

It will be understood by a person skilled in the art that pigments with a small particle size have a very high staining power on textiles whereas in comparison, pigments with a larger particle size have less staining power. For example Pthalo Blue is an organic pigment with a very high staining power on textiles and small particle size, whereas, Ultramarine Blue is an inorganic pigment with a large particle size and a lower staining power on textiles.

Pigments suitable for use in the paint composition disclosed herein include but are not limited to pigment yellow (PY14), pigment warm red (PR4), pigment Red (PR57.1), pigment red (PR101), pigment violet 27 (PV27), Pigment blue (PB15), pigment blue 29 (PB29), Pthalo Blue (PB15.3), Black Oxide, pigment green 7 (PG7), Titanium White PW6, Pigment orange 5 (PO5), pigment red 188 (PR188), warm red, Ultramarine Blue, PB29. Other pigments suitable for use in the composition disclosed herein include those used in the printing ink industry.

The inventors have found that the tempera paint composition disclosed herein does not need to have reduced amounts of pigment in order to provide a washable paint composition. The pigments may be included in the composition in an amount that provides a strong visual effect. Pigment may be included in an amount of up to about 1.5 kg, up to about 2 kg, up to about 6 kg, up to about 7 kg, up to about 10 kg, up to about 14 kg or up to 20 kg/100 L depending on the pigment used and the desired intensity of colour. Organic pigments with a strong tinting power can be used at a level of 2 kg per 100 litres and still be easily washable.

Pigment Extenders

Paint compositions are commonly formulated with other mineral compounds which do not provide any staining power or opacity. They are called extender pigments and may be used in conjunction with other pigments. Extender pigments may be used to reduce shrinkage stresses within the paint film and increase the pigment volume content at relatively low cost. The use of extender pigments can also aid in viscosity and flow control and reinforce the dry film strength. Commonly used extender pigments include crystalline calcium carbonate, silica ($SiO_2$), barytes ($BaSO_4$), talc (hydrated magnesium silicate), kaolin (hydrated aluminium silicate) and mica (hydrous aluminium potassium silicate).

The inventor has surprisingly found that use of a specific extender pigment in combination with an acrylic thickener has advantageous effects on the washability of a tempera paint composition. The inventor has surprisingly found that the use of Diatomite as the an extender pigment advantageously contributes to the washability of the paint composition disclosed herein. In one embodiment the sole extender pigment is the Diatomite "Celatom®" available from EP Minerals, Reno Nev.

Specifically, the inventor has found that diatomite, in particular Celatom®, absorbs the particles of the pigment in the paint composition disclosed herein much more effectively than known extender pigments such as crystalline calcium carbonate. Use of diatomite, in particular Celatom®, as an extender pigment, effectively absorbs the colorant pigments which prevents the penetration of the colourant pigments into the fibres of the textiles.

Diatomite is mainly used as a filtering material and is sometimes used as a flattening agent in paint but not as a sole extender in a paint composition with the objective of making a fully washable tempera paint composition.

Without being bound by theory, the inventor believes that particle size and/or absorbency of pigment extender is important. The conventional extender calcium carbonate (calcite) in its crystalline form is normally used to bulk up children's tempera paints. The calcite crystals sit amongst the much smaller particles of the colorant pigments to give the paint substance. Cystalline calcium carbonate is capable of absorbing the colorant pigments but such large amounts are needed that they whiten all of the colours to a very washed out pastel tint which is not desirable for a children's paint. However when Diatomite (Celatom) is used as the extender the porous mineral particles have the ability to absorb the sub-micron sized colorant particles, and because the diatomite particles are quite large they do not tend to penetrate the fibres of the cotton textiles and therefore make the paint much easier to remove without leaving a stain. Diatomite is extremely porous and its largish particles are able to absorb the submicron particles of colour pigments so effectively that relatively small amounts of diatomite are needed and the colours remain well wetted out by the binders and are very vivid when the desired balance is achieved.

The inventor believes there is a relationship between the proportion of pigment and extender pigment used in the paint composition disclosed herein. Essentially, there has to be enough Celatom to absorb the pigment so that it does not stain textiles. In this regard, pigments of a larger particle size such as Ultramarine are easier to remove than pigments of a smaller particle size and therefore have a lower requirement for Celatom.

There is a second relationship whereby a factor called "dry hiding" comes into play and if one wants to make light and bright colours like white, yellow, orange and warm reds slightly lighter and brighter the Celatom amount has to be high enough to call the "dry hiding" characteristic into play and this varies from pigment to pigment. There is also a relationship with the acrylic thickener (thickener/binder) which needs to be reduced to create this effect because the more binder there is in the system the more wetted out everything becomes and the dry hiding effect cannot be achieved.

The extender pigment may be present in an amount of up to about 30 kg/200 L. In one embodiment, the extender pigment is present in a range of about:1-30 kg/200 L; 5-30 kg/200 L; 10-30 kg/200 L; 15-30 kg/200 L 20-30 kg/200 L; 25-30 kg/200 L; 8-10 kg/200 L; 15 kg/200 L; 20 kg/200 L, 25 kg/200 L; or 30 kg/200 L.

The inventor has found that that the use of diatomite and amorphous calcium carbonate as extender pigments in the compositions disclosed herein, also results in a water washable paint composition. Accordingly, in one embodiment, the extender pigment is a mixture if diatomite and amorphous calcium carbonate (readily available from Europe, specifically The White Cliffs of Dover and Champagne regions).

Accordingly, use of diatomite (e.g. Celatom) as the sole extender pigment allows the acrylic thickener to act as both a thickener and binder and maintain the paint composition in a wetted out high chromatic state.

Accordingly, in one embodiment the sole extender pigment is diatomite (e.g. Celatom).

In another embodiment, the extender pigment is a mixture of only diatomite and amorphous calcium carbonate. The ratio of diatomite to amorphous calcium carbonate is about 1:2.

Thickener/Binder

One or more thickeners may be used in the paint composition disclosed herein. In one embodiment the one or more thickeners are present in an amount sufficient for them to have both a thickening and binding effect.

In one particular embodiment the acrylic thickener is selected from one or more alkali soluble or alkali swellable thickeners.

In one embodiment the paint composition does not include a conventional binder such as an alkali soluble polymer which functions as a binder. In one particular embodiment, the paint composition herein does not include any alkali soluble polymers including but not limited to those available under Acrysol™-162, Lucidene™ 361, Lucidene™ 198M, Rhoplex I-62A, Rhoplex I-98, Rhoplex I-94 all available for Dow Chemical Company or Glascol™ LE520 available from Ciba Speciality Chemicals or Joncryl 142™, Joncryl 652™ available form BASF.

In another embodiment the only thickener is the one or more acrylic thickeners, preferably one or more alkali soluble or alkali swellable thickeners. Such thickeners typically comprise the aqueous emulsion reaction product of an unsaturated carboxylic acid monomer, e.g., meth acrylic acid; a monoethylenically unsaturated monomer different from the carboxylic acid monomer, e.g. ethyl acrylate; a macromonomer comprising a hydrophobic portion and an alkoxylated portion which is polymerizable with the other monomers; and a monomer having latent crosslinking functionality.

In one embodiment the one or more thickeners are one or more acrylic alkali soluble thickeners.

Suitable thickeners include HV30 (BASF) and ASE60 (Dow). UCAR 146 and UCAR Polyphobe TR115, manufactured by Union Carbide and Acrysol DR-1, Acrysol DR-73, Acrysol ASE 60 manufactured by Rohm & Haas. ASE 60 or HV 30 are acrylic thickeners which are normally used to thicken acrylic paint formulations but in this case they are also used as the binder for the washable paint as well as performing their normal thickening function.

The inventor believes that the use of diatomite (Celatom) as the sole extender pigment allows the acrylic thickener to act as both a thickener and binder which maintains the paint composition in a wetted out high chromatic state.

The thickeners may be varied depending on the main pigments being used in order to get a uniform viscosity. The selection of alkali soluble or alkali swellable thickener and the quantity to be used for the composition of the present invention is within the skill of the person skilled in the art using routine trial and experimentation.

In one embodiment, the one or more thickeners is present in an amount of up to about: 20 kg/200 L; 10-20 kg/200 L; 15-20 kg/200 L; 16-18 kg/200 L; 15 kg/200 L, 16 kg/200 L, 17 kg/200 L or 18 kg/200 L.

Surfactant:

The composition of the present invention may include one or more surfactants which function to reduce surface tension. In one embodiment the surfactant is one or more anionic surfactants and optionally one or more non-ionic surfactants.

In one embodiment, the surfactant is present in an amount of about: 2-10 kg/200 L; 4-6 kg/200 L; or 4 kg/200 L.

The amount of anionic surfactant used will be sufficient to stabilise and/or disperse the pigment. An example of a suitable anionic surfactants are manufactured by The Dow Chemical Company under the trademarks TAMOL731 or CT171 available from AIR.

In one specific embodiment about 4 kg/200 L of non-ionic surfactant is used in the composition. Examples of a suitable non-ionic surfactants is Triton CF10.

It is well within the skill of the addressee to determine the appropriate selection of surfactants and the quantity to be used using routine trial and experimentation.

Non-volatile pH neutralisers

The pH neutraliser is herein described are "non-volatile" in the sense that it has a boiling point ≥400° C. and does not evaporate at normal temperature and pressure. Accordingly, the neutraliser does not evaporate at normal temperature and pressure and remains permanently in the paint film. Examples of such neutralisers include potassium hydroxide and sodium hydroxide.

When the paint composition disclosed herein includes potassium or sodium hydroxide as the non-volatile neutraliser, the composition achieves re-solubility easily and promotes a hygroscopic effect so that when the paint appears to be dry it is in fact retaining moisture which makes it easier to re-dissolve.

In one form the neutraliser is used in a sufficient amount to adjust the pH of the paint to a preferred level in the range of about 8.5 to 9.

In one embodiment the neutraliser is added in an amount to produce a pH level in the range of about 8.5 to 9 it is well within the skill of the addressee to select the appropriate non-volatile pH neutraliser and determine the amount required to bring about neutralisation using trial and error.

In other embodiments the neutraliser is sodium hydroxide in an amount to adjust the pH to a range of about 8.5 to 9.

The inventor believes that the specific use of the one or more acrylic thickeners and neutralising with potassium or sodium hydroxide are of importance to the paint composition described herein because they both hold the pigment very firmly in suspension and are hygroscopic which makes it very easy to dissolve them out.

The inventors have also observed that the use of potassium hydroxide to neutralise the paint at a relatively high pH results in the acrylic thickener/binder which is used in the paint being transformed into a permanently soluble salt with hydroscopic properties. In conventional paint compositions, the acrylic thickener/binder would normally be neutralised with ammonia which evaporates rapidly leaving a pH neutral acrylic salt which is not nearly as readily soluble, but which can in fact be redissolved by soaking for some time in water.

The inventor believes that the instant solubility of the potassium salt is helpful in achieving washability.

Humectant

The binder/thickeners has a water retentive effect when it is neutralised with potassium hydroxide which is hygroscopic. Once neutralized with KOH, the composition retains its pH when dry and functions as a built in humectant.

Other Additives

The composition also optionally includes one or more conventional additives such as rheology modifiers, defoamers, colloidal clays and preservatives.

It is well within the skill of the addressee to select the appropriate additive as required using trial and error.

SPECIFIC EMBODIMENTS

There is disclosed a washable paint composition comprising:
a) one or more pigments;
b) one or more thickeners in an amount that has both a thickening and binding effect;
c) one or more surfactants;
d) one or more extender pigments;
e) one or more non-volatile neutralisers, in an amount that allows the composition to remain in a re-wettable state.

There is also disclosed a paint composition comprising:
a) One or more pigments;
b) One or more acrylic thickeners in an amount that has both a thickening and binding effect;
c) One or more surfactants;
d) One or more extender pigments;
e) One or more non-volatile neutralisers,
in an amount that allows the composition to remain in a re-wettable and hygroscopic state;
and wherein the paint composition is washable from a textile.

There is disclosed a paint composition comprising:
a) One or more pigments;
b) One or more acrylic thickeners in an amount that has both a thickening and binding effect;
c) One or more surfactants;
d) One or more diatomites as the sole extender pigments;
e) One or more non-volatile neutralisers,
in an amount that allows the composition to remain in a re-wettable and hygroscopic state; and wherein the paint composition is washable from a textile.

There is provided, use of diatomite including diatomite as a sole extender pigment in the preparation of a washable paint composition wherein the diatomite is combined with:
a) One or more pigments;
b) One or more acrylic thickeners in an amount that has both a thickening and binding effect;
c) One or more surfactants;
e) One or more non-volatile neutralisers,
in an amount that allows the paint composition to remain in a re-wettable and hygroscopic state; such that the paint composition is washable from a textile.

In one embodiment the paint composition is water washable.

In one embodiment the water washable paint composition comprises:
a) One or more pigments;
b) One or more acrylic alkali soluble thickeners selected from the group consisting of: HV30 (BASF) and ASE60 (Dow), UCAR 146, UCAR Polyphobe TR115, Acrysol DR-1, Acrysol DR-73 and Acrysol ASE 60 in an amount that has both a thickening and binding effect;
c) One or more non-ionic and/or anionic surfactants;
d) An extender pigment selected from diatomite or amorphous calcium carbonite;
e) One or more non-volatile neutralisers selected from KOH and NaOH,
in an amount that allows the composition to remain in a rewettable and hygroscopic state.

There is also disclosed a paint composition comprising:
a) One or more pigments;
b) One or more acrylic alkali soluble thickeners selected selected from the group consisting of: HV30 (BASF) and ASE60 (Dow), UCAR 146, UCAR Polyphobe TR115, Acrysol DR-1, Acrysol DR-73 and Acrysol ASE 60 in an amount that has both a thickening and binding effect;
c) One or more non-ionic surfactants;
d) An extender pigment selected from diatomite or amorphous calcium carbonite;
e) One or more non-volatile neutralisers selected from KOH and NaOH,
in an amount that allows the composition to remain in a re-wettable and hygroscopic state; and wherein the paint composition is water washable from a textile.

In one embodiment, the extender pigment is diatomite. In a particular embodiment the extender pigment is Diatomite, in particular Celatom®.

In one embodiment the Diatomite is present in an amount of about: 1-30 kg/200 L; 5-30 kg/200 L; 10-30 kg/200 L; 15-30 kg/200 L, 20-30 kg/200 L; 25-30 kg/200 L; 8-10 kg/200 L; 15 kg/200 L; 20 kg/200 L, 25 kg/200 L; or 30 kg/200 L.

In another embodiment, the extender pigment is amorphous calcium carbonite;

In one embodiment, the composition includes the acrylic alkali soluble thickener as the sole thickener and binder, in an amount that has both a thickening and binding effect.

In one embodiment, the one or more thickeners is present in an amount of up to about: 20 kg/200 L; 10-20 kg/200 L; 15-20 kg/200 L; 16-18 kg/200 L; 15 kg/200 L, 16 kg/200 L, 17 kg/200 L or 18 kg/200 L.

In another embodiment, the composition includes HV 30 as the sole thickener and binder, in an amount that has both a thickening and binding effect.

In one embodiment, the composition includes HV 30 as the sole thickener and binder, in an amount of about 16-20 kg/200 L.

In one embodiment, the non-volatile neutraliser is present in an amount to neutralise the paint composition to a pH of about 8-10, particularly 8.5-9.

In one embodiment the non-volatile neutraliser is KOH.

In one embodiment, the surfactant is a non-ionic surfactant. In one particular embodiment the non-ionic surfactant is CF-10.

Further embodiments are also described in the below items:

1. A washable paint composition comprising:
a) one or more pigments;
b) one or more acrylic alkali soluble thickeners in an amount that has both a thickening and binding effect;
c) one or more surfactants;
d) one or more extender pigments selected from the group consisting of diatomite and a mixture of diatomite and amorphous calcium carbonate;
e) one or more non-volatile neutralisers selected from the group consisting of potassium hydroxide and sodium hydroxide.

2. The washable paint composition of item 1 wherein the one or more acrylic alkali soluble thickeners is present in an amount of about 10-20 kg per 200 L of the washable paint composition.

3. The washable paint composition of item 1 or 2 wherein the one or more acrylic alkali soluble thickeners is present in an amount of about: 15-20 kg, 16-18 kg, 15 kg, 16 kg, 17 kg or 18 kg per 200 L of the washable paint composition.

4. The washable paint composition of any one of item 1-3 wherein the one or more acrylic alkali soluble thickeners is selected from the group consisting of: HV30 (BASF), ASE60 (Dow), UCAR 146, UCAR Polyphobe TR115, Acrysol DR-1, Acrysol DR-73 and Acrysol ASE.

5. The washable paint composition of any one of item 1-4 wherein the one or more acrylic alkali soluble thickener is HV 30 in an amount of about 16-20 kg per 200 L of the washable paint composition.

6. The washable paint composition of any one of item 1-5 wherein the one or more pigments is present in an amount of 3-25 kg per 200 L of washable paint composition.

7. The washable paint composition of any one of item 1-6 wherein the one or more extender pigments is diatomite.

8. The washable paint composition of any one of item 1-7 wherein the one or more extender pigments is diatomite present in an amount of about: 1-30 kg, 5-30 kg, 10-30 kg, 15-30 kg, 20-30 kg, 25-30 kg, 8-10 kg, 15 kg, 20 kg, 25 kg or 30 kg per 200 L of the washable paint composition.

9. The washable paint composition of any one of item 1-8 wherein the one or more extender pigments is Celetom®.

10 The washable paint composition of any one of item 1-6 wherein the one or more extender pigments is a mixture of diatomite and amorphous calcium carbonate.

11. The washable paint composition of item 10 wherein the ratio of diatomite to amorphous calcium carbonate is about 1:2.

12. The washable paint composition of any one of item 1-11 wherein the non-volatile neutraliser is present in an amount to adjust the washable paint composition to a pH of about 8.5-9.

13. The washable paint composition of any one of item 1-12 wherein the non-volatile neutraliser is KOH.

14. The washable paint composition of any one of item 1-13 wherein the acrylic alkali soluble thickener is the sole thickener and binder 15. The washable paint composition of item 1 comprising:
a) One or more pigments;
b) One or more acrylic alkali soluble thickeners in an amount that has both a thickening and binding effect;
c) One or more non-ionic and/or anionic surfactants;
d) An extender pigment selected from diatomite or diatomite and amorphous calcium carbonite;
e) One or more non-volatile neutralisers selected from KOH and NaOH in amount to adjust the pH of the paint composition to a range of 8.5-9.

16. The washable paint composition of item 1 comprising:
a) One or more pigments;
b) One or more acrylic alkali soluble thickeners in an amount that has both a thickening and binding effect;
c) an non-ionic and anionic surfactant; non-ionic surfactant is CF-10
d) An extender pigment that is diatomite;
e) One or more non-volatile neutralisers selected from KOH in amount to adjust the pH of the paint composition to a range of 8.5-9.

17. The washable paint composition of item 1 comprising:
a) One or more pigments in an amount of 3-25 kg per 200 L of paint composition;
b) One or more acrylic alkali soluble thickeners in an amount of 16-18 kg per 200 L of paint composition;
c) an non-ionic and anionic surfactant;
d) An extender pigment that is diatomite in an amount of 10-30 kg per 200 L of paint composition;
e) One or more non-volatile neutralisers selected from KOH in amount to adjust the pH of the paint composition to a range of 8.5-9;
wherein the paint composition is made up to volume with water.

18. The washable paint composition any one of item 1-17 wherein the one or more pigments, one or more acrylic alkali thickeners, one or more surfactants, one or more extender pigments and one or more non-volatile neutralisers are present in an amount that allows the composition to remain in a re-wettable and hygroscopic state; and wherein the paint composition is washable from a textile.

19. The washable paint composition of any one of item 1-18 wherein the washable paint composition is capable of being removed from a cotton textile by washing with a water solution.

20. The washable paint composition of any one of item 1-18 wherein the washable paint composition is capable of being removed from a cotton textile by washing with a water and detergent solution.

21. Use of diatomite as a sole extender pigment in the preparation of a washable paint composition wherein the diatomite is combined with:
a) One or more pigments;
b) One or more acrylic thickeners in an amount that has both a thickening and binding effect;
c) One or more surfactants;
e) One or more non-volatile neutralisers,
in an amount that to form a paint composition to remain in a re-wettable and hygroscopic state; such that the paint composition is washable from a textile.

22 Use of diatomite as a sole extender pigment in the preparation of a washable paint composition wherein the diatomite in an amount of 10-30 kg per 200 L of paint composition is combined with:
a) one or more pigments in an amount of 3-25 kg per 200 L of paint composition;
b) one or more acrylic alkali soluble thickeners in an amount of 16-18 kg per 200 L of paint composition;
c) an non-ionic and anionic surfactant;
d) one or more non-volatile neutralisers selected from KOH in amount to adjust the pH of the paint composition to a range of 8.5-9;
e) made to volume with water.

23. A method of solubilising the washable paint composition according to any one of items 1-20 from a cotton based textile stained with the washable paint composition comprising the step of contacting the cotton based textile stained with the washable paint composition with a water solution for a period of time sufficient to solubilise the washable paint composition.

24. The method of item 23 wherein the water solution is a water and detergent solution.

25. The method of item 23 or 24 wherein the cotton based textile stained with the washable paint composition is washed and/or rinsed one or more times with the water solution to allow removal of the solubilised paint composition from the cotton based textile.

26. The method of item 25 wherein the paint composition is washed and/or rinsed from the cotton based textile without leaving a stain.

27 Use of a mixture of diatomite and calcium carbonate as sole extender pigments in the preparation of a washable paint composition wherein the diatomite and amorphous calcium carbonate are combined with:
a) one or more pigments;
b) one or more acrylic alkali thickeners in an amount that has both a thickening and binding effect;
c) one or more surfactants;
d) one or more non-volatile neutralisers

DEFINITIONS

The paint composition disclosed herein is "washable". In the context of the present invention, the paint composition is "washable" from a cotton or cotton/synthetic textile when the wet or dried paint composition is able to be removed from the textile by washing the textile with water and detergent. The paint composition may be in contact with the water and detergent for a period of time sufficient to remove the paint composition from the textile. This may vary from a few seconds through to soaking the textile with paint composition in water and detergent for a few hours or a day or more, such as overnight.

The paint composition dries to a state that is resoluble in water. The paint composition may be dried under ambient conditions to a semi-dry or a dry state. The paint composition disclosed herein is hygroscopic and therefore maintains a high moisture content under ambient conditions for extended periods of time.

The paint composition is "resoluble in a water solution" means that following application of a water solution to the dry or semi-dried paint composition, the paint composition is able to dissolve in water. This may be referred to as the wet state and includes a state where the composition can be easily moved and manipulated, for instance by a paint brush.

The paint composition remains in a "rewettable and hygroscopic state". By rewettable, it will be understood that the paint composition upon drying to its dry or semi-dry state is able to be converted back into its wet state. Conversion of the paint composition for its dry state to its wet state can be done by contacting the paint composition with water.

The term "hygroscopic" will be understood to mean that the paint composition maintains a high moisture content.

Without being bound by theory, the inventor believes that the paint remains hygroscopic because the acrylic salt that is formed by adding the potassium hydroxide or NaOH is hygroscopic and the pH is maintained at a high level because the potassium or sodium is non migratory, and since the atmosphere normally contains a certain amount of humidity the paint film is in fact plasticised by the presence of moisture. If the acrylic thickener dried completely as it would if it was an acrylic salt neutralised with ammonia because the free ammonia evaporates when the paint dries, the paint film would become brittle.

"Textile" includes any form of woven cotton material including but not limited to cotton and synthetic mixes. It may be interchangeably referred to as "cotton based textiles".

The composition is in a "wetted out high chromatic state" means that the composition maintains in its dry state, the chromatic intensity achieved when in its wet state.

The washable paint compositions disclosed herein use conventional paint chemicals in an unconventional way. The resulting washable tempera paint compositions disclosed herein include ingredients commonly found in acrylic paint compositions although in very different proportions. Specifically, the paint compositions disclosed herein contain acrylic alkali thickeners, which are normally used to thicken traditional acrylic paint formulations but they do not require traditional acrylic paint binders. The paint composition disclosed herein uses the alkali soluble thickener in an amount that enables it to function also as the binder. Specifically, the alkali soluble thickener is used at higher levels in the composition disclosed herein than it would be used in traditional acrylic paint compositions. Accordingly, the acrylic alkali soluble thickener has both a thickening and binding effect on the composition disclosed herein. In acrylic paint compositions, these alkali soluble thickeners are normally neutralised with ammonia to promote water resistance on account of the ammonia which readily evaporates rapidly leaving a pH neutral acrylic salt which is not readily soluble. However, the use of NaOH and KOH to neutralise the tempera paint composition disclosed herein at relatively high pH results in the acrylic thickener/binder being transformed into a permanently soluble salt that is easily resoluble, thereby helping washability. The potassium and sodium hydroxide also promotes a hygroscopic effect so that when the paint appears to be dry it is in fact retaining moisture which also makes it easier to redissolve.

MODES FOR CARRYING OUT THE INVENTION

In order to better understand the nature of the invention a water based paint composition of the present invention may be formulated as indicated in the following Examples.

EXAMPLES

A paint composition according to one embodiment of the present disclosure is as follows:
a) Pigment: 3-40 kg/200 L.
b) Acrylic thickener/binder:HV30 (anionic polyacrylate copolymer 30% active content, pH 3 density 1.05) 16-25 kg/200 L—at this high level the thickener functions as a binder.
c) about 20 kg of diatomite as pigment extender
d) nonionic surfactant—4 kg/200 L
e) anionic surfactant—sufficient to stabilise and/or disperse the pigment
e) KOH as neutraliser—remains in paint so as to get hygroscopic effect When the above components are used together in the correct amounts required to release pigment stains from cotton or cotton blend textiles an easily washable paint is obtained. Each colour has a different requirement which must be balanced to give the desired effect.

In general organic pigments with characteristically small particle sizes require the "most treatment", Pthalo Blue and Methyl Violet requiring the most, while large particle inorganic pigments require less.

The amounts of Celatom needed to render specific colours easily washable varies considerably. The most difficult colour to balance is Pthalo Blue (PB15.3) because it needs to dry to a dark tone value and the mixture is 4 kg of dry pigment to 20 kg of Celatom and 20 kg of HV30. The other most difficult colour is Black Oxide where the pigment load is 20 kg of Black Oxide Pigment and 30 kg of Celatom and 20 kg of HV30. Light colours like yellow, orange and warm red can take 25 kg of Celatom with the HV30 reduced to 16-18 kg/200 L in some cases and the pigment load is 4 kg of dry pigment.

Another colour is Ultramarine Blue where the dry pigment load is 20 kg and it requires only 8-10 kg of Celatom and 20 kg of HV30.

In one embodiment, the formula contains dispersed pigments and a solution acrylic thickener used as binder and thickener plus diatomite. The thickeners ASE60 from Dow or HV30 (BASF) are neutralised with potassium hydroxide which is a non-volatile neutralizer and maintains the polymer in a re wettable and hygroscopic condition. Under these the conditions the children's paint which appears to have dried actually remains moist enough to remove most of the stain in running water under the tap, and the residual stain comes out easily in the wash.

The above composition may be prepared by mixing the components according to procedures know in the art.

The commercially available products suitable for the tempera paint compositions disclosed herein are shown in Table 1:

| Ingredient (manufacturer) | Ingredient Function |
|---|---|
| Pigments (Chromaflow Technologies Aust) | Pigment |
| HV30 (BASF) | Thickener/Binder |
| CF-10 (Dow) or Turgitol (ICI) | Non-ionic surfactant |
| Sodium hydroxide (Sigma Aldrich) | neutraliser |
| Potassium Hydroxide (Redox Chemicals) crystalline form | neutraliser |
| Diatomite (EP Minerals, Reno Nevada) | extender |
| Tammol 731 (Dow) and CT171 (AIR) | Anionic surfactant |

The examples shown in Table 2 were made up to 200 L with water. The washable paint compositions in the following Examples comprise:
 3-40 Kg colorant pigment
 10-30 kg of extender
 16-18 kg of HV30 (thickener)
 Neutralised to pH8.5-9 with potassium hydroxide
 4 kg of non-ionic surfactant
made up to 200 litres with water

TABLE 2

Washable paint formulations according to the present disclosure per 200 litres

| Ex | Pigment | Extender | Thickener HV30 | Surfactant CF10 | Neutraliser |
|---|---|---|---|---|---|
| 1 | Yellow: Yellow 14 4 kg and Titanium White-8 kg | 20 kg Celatom | 18 kg | 4 kg | KOH to pH 8.5-9. |
| 2 | Warm Yellow: as in Ex 1 but shaded faintly with pigment red 188 | 20 kg Celatom | 18 kg | 4 kg | KOH to pH 8.5-9. |
| 3 | Orange - 4 kg pigment orange 16 | 25 kg Celatom | 16 kg | 4 kg | KOH to pH 8.5-9. |
| 4 | Warm Red - 4 kg of PR4 | 20 kg Celatom | 16 kg | 4 kg | KOH to pH 8.5-9. |
| 5 | Cool Red - 3 kg of pigment red 57.1 | 20 kg Celatom | 16 kg | 4 kg | KOH to pH 8.5-9. |
| 6 | Green Deep - 2 kg of pigment green 7 plus 2 kg PY14 | 20 kg Celatom/ | 18 kg | 4 kg | KOH to pH 8.5-9. |
| 7 | Cool Blue - 4 kg of pigment blue 15 | 20 kg Celatom/ | 18 kg | 4 kg | KOH to pH 8.5-9. |
| 8 | Warm Blue - 25 kg of pigment blue 29 | 8 kg Celatom | 18 kg | 4 kg | KOH to pH 8.5-9. |

TABLE 2-continued

Washable paint formulations according to the present disclosure per 200 litres

| Ex | Pigment | Extender | Thickener HV30 | Surfactant CF10 | Neutraliser |
|---|---|---|---|---|---|
| 9 | Purple - 1 kg of pigment violet 27, | 25 kg Celatom | 18 kg | 4 kg | KOH to pH 8.5-9. |
| 10 | Brown - 10 kg of red oxide pigment 101 and 3 kg of Black oxide | 25 kg Celatom | 18 kg | 4 kg | KOH to pH 8.5-9. |
| 12 | Ultramarine Blue 20 kg | 8-10 kg Celatom | 20 kg | 4 kg | KOH to pH 8.5-9. |
| 13 | Pthalo Blue (PB15.3) 4 kg | 20 kg Celatom | 20 kg | 4 kg | KOH to pH 8.5-9.. |
| 14 | Black Oxide pigment 20 kg | 30 kg Celatom | 20 kg | 4 kg | KOH to pH 8.5-9. |
| 15 | Cool Red - 3 kg of pigment red 57.1 | 10 kg Celatom 20 kg amorphous $CaCO_3$ | 16 kg | 4 kg | KOH to pH 8.5-9. |
| 16 | Pthalo Blue (PB15.3) 4 kg | 10 kg Celatom 20 kg amorphous $CaCO_3$ | 20 kg | 4 kg | KOH to pH 8.5-9.. |
| 17 | White (titanium dioxide) 40 kg | 20 kg Celetom | 25 kg | 4 kg | KOH to pH 8.5-9.. |

The use of surfactants is as follows: 4 kg of non-ionic surfactant per 200 L for all the colours; the anionic surfactant used for the Celetom is Tammol 731 at 6% on the weight of the Celetom used (which varies); for the inorganic pigments Titanium, black oxide and red oxide, 6% of Tammol 731 is used on the dry pigment weight; for all of the organic pigments used in the other colours, 8-10% Tammol 731 is supplemented with CT171 where needed.

Pthalo Blue is an organic pigment with very high staining power and very small particle size. Ultramarine Blue is an inorganic pigment with fortunately a very large particle size which requires a very small amount of Celatom.

Comparison with Commercially available children's paint products:
1) "Crayola® Artista 2 Washable"—this is a known water washable children's poster paint composition and was used as a bench mark.
2) "FAS™ Super Tempera" paint available from Modern Teaching Aids or Fas.
3) "FAS™ Total Wash" poster paint available from Modern Teaching Aids or Fas.
4) "Liquitemp® Poster Paint" available from Educational Colours
5) Composition according to the present disclosure according to Table 2.

Vibrancy

The vibrancy of colour of the above five paint compositions 1)-5) were compared following application of each paint sample to paper. 1)-4) are commercially available. For 5), the pigments tested were pthalo blue, black oxide, red and yellow prepared according to Table 2. The closest commercially available colour was chosen for testing.

The vibrancy of the present washable paint composition 5) was found to be comparable to that of 4) Liquitemp®. The vibrancy of composition 5) was found to be slightly better than the Crayola product 1) and much better than the FAS products 2) and 3).

Washability

The washability of the above 5 paint compositions 1)-5) were tested and compared. 1)-4) are commercially available. For 5), the pigments tested were pthalo blue, black oxide, red and yellow prepared according to Table 2. The closest commercially available colour was chosen for testing.

For each colour the following test was followed:
a) the paint was applied to a cotton textile and left to dry overnight;
b) The resulting paint on the cotton textile was washed with gentle rubbing with hands with running water under a tap;
c) The cotton textile was soaked in a laundry detergent for 2 h, rubbed and left overnight.
d) The cotton textiles were rinsed with water and re-examined For the Crayola product 1) and the composition disclosed herein 5), all colours were removed from the textile at the end of step d).

For products 2)-4) a colour stain from each colour remained after step d).

Crayola 1) and the composition according to the paint composition of the present disclosure 5) were found to be water washable for a range of colours compared to commercially available products which all left colour stains on the textile.

CONCLUSION

The paint compositions of the present disclosure was found to have both good colour vibrancy and water washability.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A resoluble paint composition consisting essentially of:
   a) one or more pigments in an amount of 3-40 kg per 200 L of the resoluble paint composition;
   b) one or more acrylic alkali soluble thickeners in an amount of 10-25 kg per 200 L of the resoluble paint composition;
   c) one or more surfactants;
   d) one or more extender pigments in an amount of 1-30 kg per 200 L of the resoluble paint composition, wherein the one or more extender pigments is selected from diatomite or a mixture of diatomite and amorphous calcium carbonate; and
   e) one or more non-volatile neutralisers selected from potassium hydroxide and sodium hydroxide, wherein the non-volatile neutraliser is present in an amount to adjust the resoluble paint composition to a pH of about 8.5-9;
   wherein the resoluble paint composition provides the same chromatic intensity in both the wet and dry state.

2. The resoluble paint composition of claim 1 wherein the one or more acrylic alkali soluble thickeners is present in an amount of about 15-20 kg per 200 L of the resoluble paint composition.

3. The resoluble paint composition of claim 1 wherein the one or more pigments is present in an amount of 3-25 kg per 200 L of the resoluble paint composition.

4. The resoluble paint composition of claim 1 wherein the one or more extender pigments is diatomite.

5. The resoluble paint composition of claim 1 wherein the one or more extender pigments is diatomite present in an amount of about 10-30 kg per 200 L of the resoluble paint composition.

6. The resoluble paint composition of claim 1 wherein the one or more extender pigments is a mixture of diatomite and amorphous calcium carbonate, wherein the ratio of diatomite to amorphous calcium carbonate is about 1:2.

7. The resoluble paint composition of claim 1 wherein the non-volatile neutraliser is KOH.

8. The resoluble paint composition of claim 1 wherein the surfactant is one or more non-ionic and/or anionic surfactants.

9. The resoluble paint composition of claim 1 wherein the surfactant is a non-ionic surfactant.

10. The resoluble paint composition of claim 1 comprising:
    one or more acrylic alkali soluble thickeners in an amount of 16-18 kg per 200 L of the resoluble paint composition;
    c) a non-ionic and anionic surfactant;
    d) an extender pigment that is diatomite in an amount of 10-30 kg per 200 L of the resoluble paint composition; and
    e) KOH in amount to adjust the pH of the resoluble paint composition to a range of 8.5-9;
    wherein the resoluble paint composition is made up to volume with water.

11. The resoluble paint composition of claim 1 wherein the one or more pigments, one or more acrylic alkali thickeners, one or more surfactants, one or more extender pigments and one or more non-volatile neutralisers are present in an amount that allows the resoluble paint composition to remain in a re-wettable and hygroscopic state; and wherein the resoluble paint composition is removed from a textile.

12. The resoluble paint composition of claim 1 wherein the resoluble paint composition is capable of being removed from a cotton textile by resolubilizing the resoluble paint composition with a water solution or a water and detergent solution.

13. A method of solubilising the resoluble paint composition according to claim 1 from a cotton based textile stained with the resoluble paint composition comprising the step of contacting the cotton based textile stained with the resoluble paint composition with a water solution for a period of time sufficient to solubilise the resoluble paint composition.

14. The method of claim 13 wherein the cotton based textile stained with the resoluble paint composition is rinsed one or more times with the water solution to allow removal of the solubilised resoluble paint composition from the cotton based textile.

* * * * *